United States Patent
Ono

(10) Patent No.: US 10,055,356 B2
(45) Date of Patent: Aug. 21, 2018

(54) MEMORY DEVICE AND METHOD FOR CONTROLLING MEMORY DEVICE

(71) Applicant: Panasonic Intellectual Property Management Co., Ltd., Osaka (JP)

(72) Inventor: Tadashi Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/451,884

(22) Filed: Mar. 7, 2017

(65) Prior Publication Data

US 2017/0177239 A1 Jun. 22, 2017

Related U.S. Application Data

(63) Continuation of application No. PCT/JP2015/002582, filed on May 22, 2015.

(30) Foreign Application Priority Data

Sep. 12, 2014 (JP) ................................ 2014-186104

(51) Int. Cl.
*G06F 12/1027* (2016.01)
*G06F 3/06* (2006.01)
*G06F 12/128* (2016.01)

(52) U.S. Cl.
CPC ........ *G06F 12/1027* (2013.01); *G06F 3/0607* (2013.01); *G06F 3/0655* (2013.01);
(Continued)

(58) Field of Classification Search
None
See application file for complete search history.

(56) References Cited

U.S. PATENT DOCUMENTS

| 2005/0223174 A1 | 10/2005 | Mogi et al. |
| 2006/0218350 A1 | 9/2006 | Mogi et al. |

(Continued)

FOREIGN PATENT DOCUMENTS

| JP | 2003-330797 | 11/2003 |
| JP | 2005-285058 | 10/2005 |

(Continued)

OTHER PUBLICATIONS

International Search Report issued in International Application No. PCT/JP2015/002582 dated Aug. 25, 2015.

*Primary Examiner* — Sean D Rossiter
*Assistant Examiner* — Charles J Choi
(74) *Attorney, Agent, or Firm* — Wenderoth, Lind & Ponack, L.L.P.

(57) ABSTRACT

Provided is a memory device with improved memory region usage efficiency. The memory device includes flash memory including: a control information (FAT) region that stores FAT for a file and a user data (UD) region that stores UD; cache memory including a FAT cache region that stores all or part of the FAT; an I/F that receives a write command for writing one of the FAT and the UD; and a memory controller that determines whether write data to be written is the FAT or the UD based on an address included in the write command, and sets the size of the FAT cache region based on an update frequency or an update count for the address included in the write command for the write data determined to be the FAT by the determiner.

10 Claims, 15 Drawing Sheets

(52) U.S. Cl.
CPC .......... *G06F 3/0659* (2013.01); *G06F 3/0679* (2013.01); *G06F 3/0685* (2013.01); *G06F 12/128* (2013.01); *G06F 2212/68* (2013.01); *G06F 2212/69* (2013.01); *G06F 2212/70* (2013.01)

(56) References Cited

U.S. PATENT DOCUMENTS

| | | |
|---|---|---|
| 2007/0214309 A1 | 9/2007 | Matsuura et al. |
| 2007/0245088 A1 | 10/2007 | Mogi et al. |
| 2013/0198439 A1 | 8/2013 | Kurotsuchi et al. |

FOREIGN PATENT DOCUMENTS

| | | |
|---|---|---|
| JP | 2009-9279 | 1/2009 |
| JP | 4418439 | 2/2010 |
| JP | 2013-152676 | 8/2013 |
| JP | 2014-116516 | 6/2014 |

MEMORY DEVICE AND METHOD FOR CONTROLLING MEMORY DEVICE

CROSS REFERENCE TO RELATED APPLICATIONS

This is a continuation application of PCT International Application No. PCT/JP2015/002582 filed on May 22, 2015, designating the United States of America, which is based on and claims priority of Japanese Patent Application No. 2014-186104 filed on Sep. 12, 2014. The entire disclosures of the above-identified applications, including the specifications, drawings and claims are incorporated herein by reference in their entirety.

FIELD

The present disclosure relates to a memory device including cache memory and a method for controlling the memory device.

BACKGROUND

Patent Literature (PTL) 1 discloses, for example, a non-volatile memory device that includes primary memory and auxiliary memory, and stores data input from an access device. The memory device is, for example, a portable auxiliary memory device, such as USB memory. The access device is, for example, a computer such as a personal computer (PC), a car navigation system, or audio equipment.

The primary memory in the memory device includes, for example, non-volatile memory such as flash memory. The auxiliary memory includes, for example, resistive random access memory (ReRAM) or magnetoresistive random access memory (MRAM).

Data input into the access device includes a file allocation table (FAT and user data (hereinafter referred to as UD). A FAT is a table for managing a file system. UD is content data, such as photo data or document data.

CITATION LIST

Patent Literature

[PTL 1] Japanese Patent No. 4418439

SUMMARY

Technical Problem

However, there is a problem with conventional memory devices that the memory is not efficiently used to a sufficient degree.

The present disclosure provides a memory device and method for controlling the memory device that make it possible to further efficiently utilize a memory region.

Solution to Problem

A memory device according to the present disclosure includes: first non-volatile memory including a control information region that stores control information for a file and a user data region that stores user data; second non-volatile memory including a control information cache region that stores all or part of the control information; an access controller that receives a write command for writing one of the control information and the user data; and a memory controller that sets a size of the control information cache region. The memory controller includes: a determiner that determines whether write data to be written is the control information or the user data based on an address included in the write command; and a region setter that sets the size of the control information cache region based on one of an update frequency and an update count for the address included in the write command for the write data determined to be the control information by the determiner.

Moreover, a method for controlling a memory device is executed in the memory device. The memory device includes: first non-volatile memory including a control information region that stores control information for a file and a user data region that stores user data; second non-volatile memory including a control information cache region that stores all or part of the control information; an access controller that receives a write command for writing one of the control information and the user data; and a memory controller that sets a size of the control information cache region. The method includes: determining, by the memory controller, whether write data to be written is the control information or the user data based on an address included in the write command; and setting, by the memory controller, the size of the control information cache region based on one of an update frequency and an update count for the address included in the write command for the write data determined to be the control information by the determiner.

Advantageous Effects

The memory device and method for controlling the memory device according to the present disclosure are capable of further efficiently utilizing a memory region.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Description of Technical Problem

Figure 1:
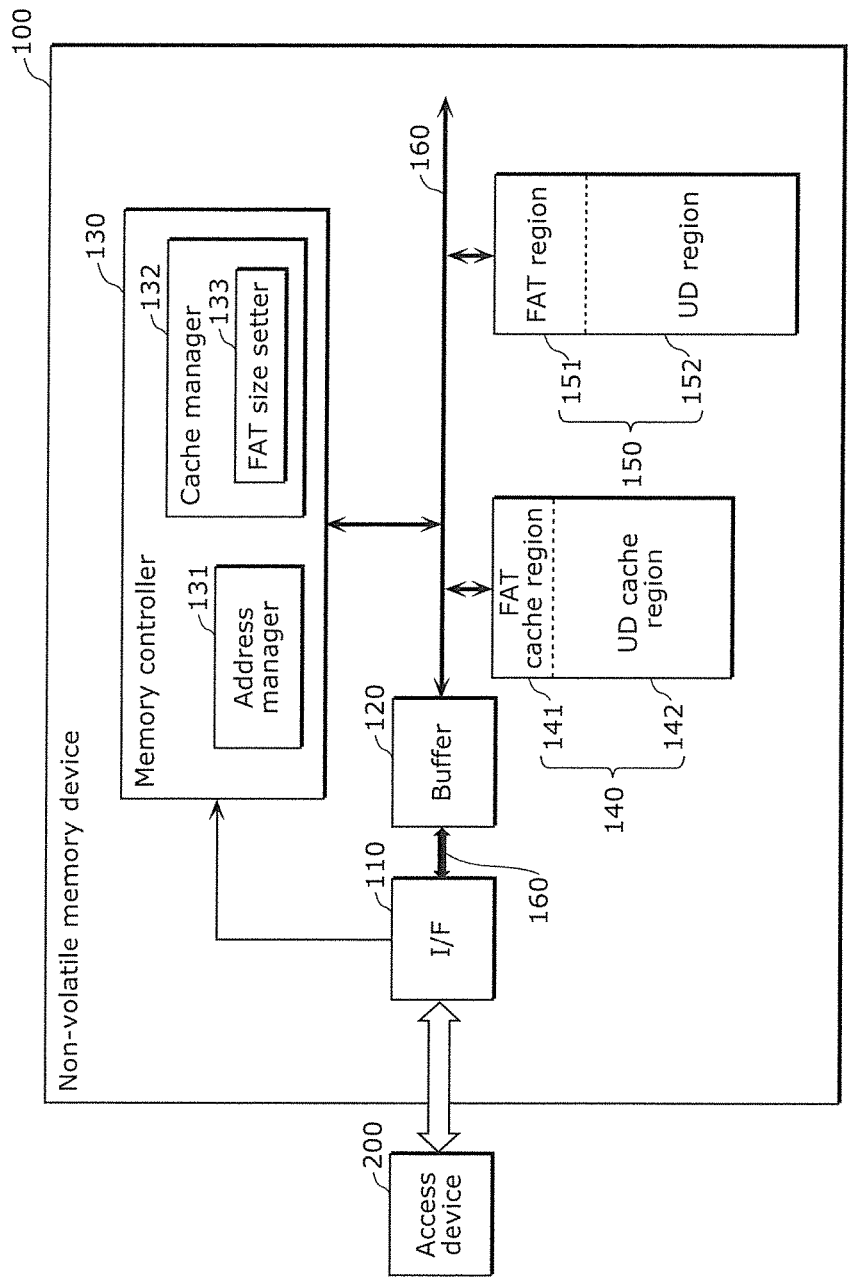
FIG. 1 is a block diagram illustrating a configuration of a non-volatile memory device (memory device) according to Embodiment 1.

With the flash memory used in the above described memory device, written bits are not overwritable. With the flash memory, in order to store new data in a memory region in which data is already stored (i.e., overwrite the stored data with new data), it is necessary to first secure a new deleted block (new block). Then, in addition to writing the data to be updated to the new block, the data which is not to be updated is copied from the block it is currently written in to the new block. The data in the block from which the data was copied is deleted at an appropriate time.

Moreover, since the write endurance for flash memory is limited, for example, to approximately 2000 to 3000 write cycles in the case of multiple level cell (MLC) flash memory, keeping the number of write cycles to a minimum is important from the viewpoint of increasing the lifespan of the memory device.

In the memory device according to PTL 1, to reduce the number of write cycles made to the flash memory, the priority for storing the FAT, which is frequently rewritten, into the primary memory is set lower than the priority for storing the UD.

In this case, the auxiliary memory is used as cache memory. For example, memory that has a higher write endurance than flash memory and whose data is capable of being overwritten in bit units, such as resistive random access memory (ReRAM), is used for such cache memory. In this case, when data, regardless of being FAT data or UD, input from the access device is temporarily held in the auxiliary memory (for example, the cache memory) and data having the same address is subsequently received, the data held in the auxiliary memory can typically be overwritten.

Here, conventionally, the size of the FAT cache region for the FAT allocated in the cache memory and the size of the UD cache region allocated for UD in the cache memory are fixed. Note that PTL 1 does not disclose the size of the regions allocated for the input FAT and UD.

The inventor of the present disclosure discovered that in the FAT, which includes data that is frequently rewritten and data that is comparatively written a fewer number of times, addresses, which are frequently rewritten, change in accordance with, for example, the configuration of the access device including the memory device. When the size of the FAT region is fixed, if the size of frequently rewritten data in the FAT is smaller than the size of the FAT region, there is a problem that part of the FAT region cannot be efficiently utilized as data rewriting is not performed for the most part. Further, when amount of data in the FAT that is frequently rewritten is greater than the size of the FAT region, since the cache region is full, when address data not stored in the cache is received, there is a need to store part of the data that is in the cache region in the flash and free up the cache region for newly received FAT data, whereby a problem arises in that the number of writes to the flash memory increases.

More specifically, for example, assume that the cache memory has a capacity of 512 KB and only the FAT can be stored in the cache memory. In this case, when specific data in the range of 64 KB is data that is frequently rewritten, there is a problem that only 64 KB of the 512 KB cache is efficiently used. In such a case, for example, by setting the remainder of the cache memory—that is to say, the region of the cache memory other than the 64 KB region that is frequently rewritten—as the UD, efficient usage of the cache memory is conceivable. Further, it is possible to write into the cache upon writing to the same UD address, thereby reducing the number of writes to the flash memory.

In the case of a swappable memory device, the device attaches to various access devices. There is a vast variety of patterns of writing to the memory device—that is to say, addresses and sizes of data that is frequently rewritten in the FAT—due to the various access devices. As such, when the size of the FAT region that can hold the FAT is set in advance, just as described above, there is a problem in that optical flash writing cannot be performed since, for example, the cache region cannot be efficiently used or there is a need to write to the flash each time the cache memory becomes full.

Hereinafter, embodiments will be described in detail with reference to the drawings. However, unnecessarily detailed descriptions may be omitted. For example, detailed descriptions of well-known matters or descriptions of components that are substantially the same as components described previous thereto may be omitted. This is to avoid unnecessary redundancy and provide easily read descriptions for those skilled in the art.

Note that the inventor has provided the appended drawings and following description for the purpose of facilitating sufficient understanding of the present disclosure by those skilled in the art. Accordingly, the appended drawings and following description are not intended to limit the scope of the claims.

Embodiment 1

Hereinafter, Embodiment 1 will be described with reference to FIG. 1 through FIG. 8.

The memory device according to this embodiment is a non-volatile memory device including cache memory and flash memory. The access device is a device that transmits the FAT or UD.

(1-1. Configuration)

FIG. 1 is a block diagram for the non-volatile memory device according to Embodiment 1.

The non-volatile memory device 100 includes an interface (I/F) 110, a buffer 120, a memory controller 130, cache memory 140, and flash memory 150. These elements are connected together by a memory bus 160 in the non-volatile memory device 100.

In this embodiment, the data included in the FAT and UD are managed in page units. In this embodiment, one page is 16 KB.

The FAT is one example of control information for a file. Since the FAT is often updated in sizes smaller than one page (16 KB), it is managed in one-page units. The FAT processing unit is referred to as a FAT page.

As described above, UD is user data. Since the UD is required to be read and written at higher speeds and in bigger sizes than the FAT, the UD is processed in plural-page units (in this embodiment, in two-page units). The UD processing unit is referred to as a UD page. Note that the UD processing unit (for example, a write unit) is dependent on the parallel number of the memory chips in flash memory 150. This will be described in more detail in the "flash memory configuration" section below.

(1-1-1. I/F Configuration)

The I/F 110 is one example of the access controller that receives a command including a write command for writing the FAT or UD. The I/F 110 is connected to an access device 200 and receives commands and data input from the access device 200. The I/F 110 analyzes commands transmitted from access device 200. The I/F 110 transmits to the memory controller 130 a command analysis result indicating whether the command is a write command instructing writing of the data, a read command instructing reading of the data, or some other command.

When the command transmitted from the access device 200 is a write command, the I/F 110 then receives and stores in the buffer 120 write data (data to be written) transmitted from the access device 200. When the command transmitted from the access device 200 is a read command, the I/F 110 transmits to the access device 200 data stored in the buffer 120 by memory controller 130 as read data (data to be read).

(1-1-2. Buffer and Data (UD, FAT) Configuration)

The buffer 120 is memory that temporarily holds write data input from I/F 110 or read data output to I/F 110.

(1-1-3. Cache Memory Configuration)

As illustrated in FIG. 1, the cache memory 140 is one example of the second non-volatile memory that includes a FAT cache region 141 that stores all or part of the FAT. The FAT cache region 141 is one example of the control information cache region. The cache memory 140 may further include a UD cache region 142 that stores all or part of the UD. The cache memory 140 includes high-speed non-volatile memory capable of being accessed in bit units, such as resistance random access memory (ReRAM). In this embodiment, the size of the FAT cache region 141 is variable. Accordingly, the size of the UD cache region 142 is variable.

Figure 2:
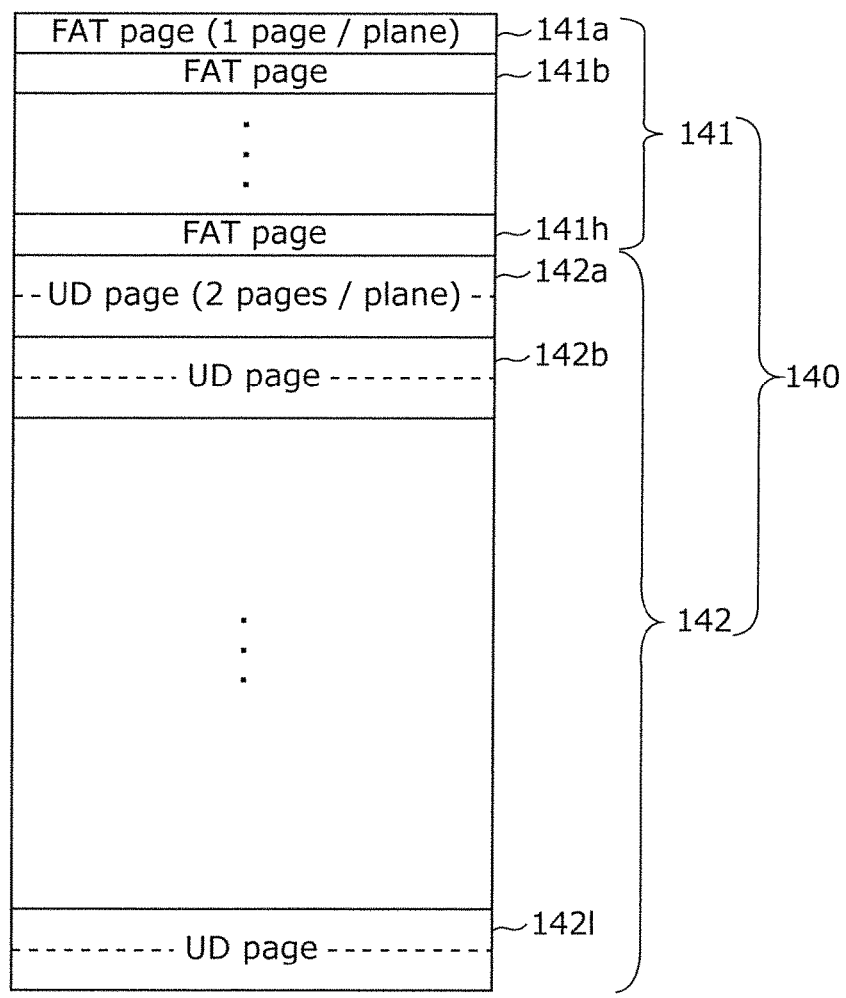
FIG. 2 illustrates one example of a configuration of a cache memory.

FIG. 2 illustrates one example of a configuration of the cache memory. As illustrated in FIG. 2, the memory region of the cache memory 140 includes the FAT cache region 141 and the UD cache region 142.

In FIG. 2, the writing unit for the FAT in the FAT cache region 141 is one page. As such, one page (in this embodiment, 16 KB) is managed as one unit (hereinafter, this management unit is also referred to as a "plane"). In other words, the FAT cache region 141 is configured of one or more FAT pages. The size of each FAT page is one page. Moreover, in FIG. 2, the writing unit for the UD in the UD cache region 142 is two pages. As such, two pages (in this embodiment, 32 KB) are managed as one unit (one plane). In other words, the UD cache region 142 is configured of one or more UD pages. The size of UD page per plane is two pages.

In the example illustrated in FIG. 2, for example, a region 512 KB in size is secured for the cache memory 140, and a region 128 KB in size is secured for the FAT cache region 141. Here, the FAT cache region 141 is managed in eight planes of FAT pages 141a through 141h (128 KB/16 KB=8 planes).

Moreover, here, a region 384 KB in size is secured for the UD cache region 142 (512 KB−128 KB=384 KB). As such, the UD cache region 142 is managed in 12 planes of UD pages 142a through 142l (384 KB/32 KB=12 planes).

(1-1-4. Flash Memory Configuration)

The flash memory 150 is one example of the first non-volatile memory that includes the FAT region 151 that stores the FAT and the UD region 152 that stores UD. The FAT region is one example of the control information region. The UD region is one example of the user data region.

The flash memory 150 includes a plurality of memory chips. Note that in current non-volatile memory devices 100, in order to achieve high-speed reading and writing, it is typical to connect a plurality of memory chips in parallel with memory bus 160 to achieve a single flash memory 150. In this embodiment, flash memory 150 is exemplified as including a plurality of memory chips.

Figure 13:
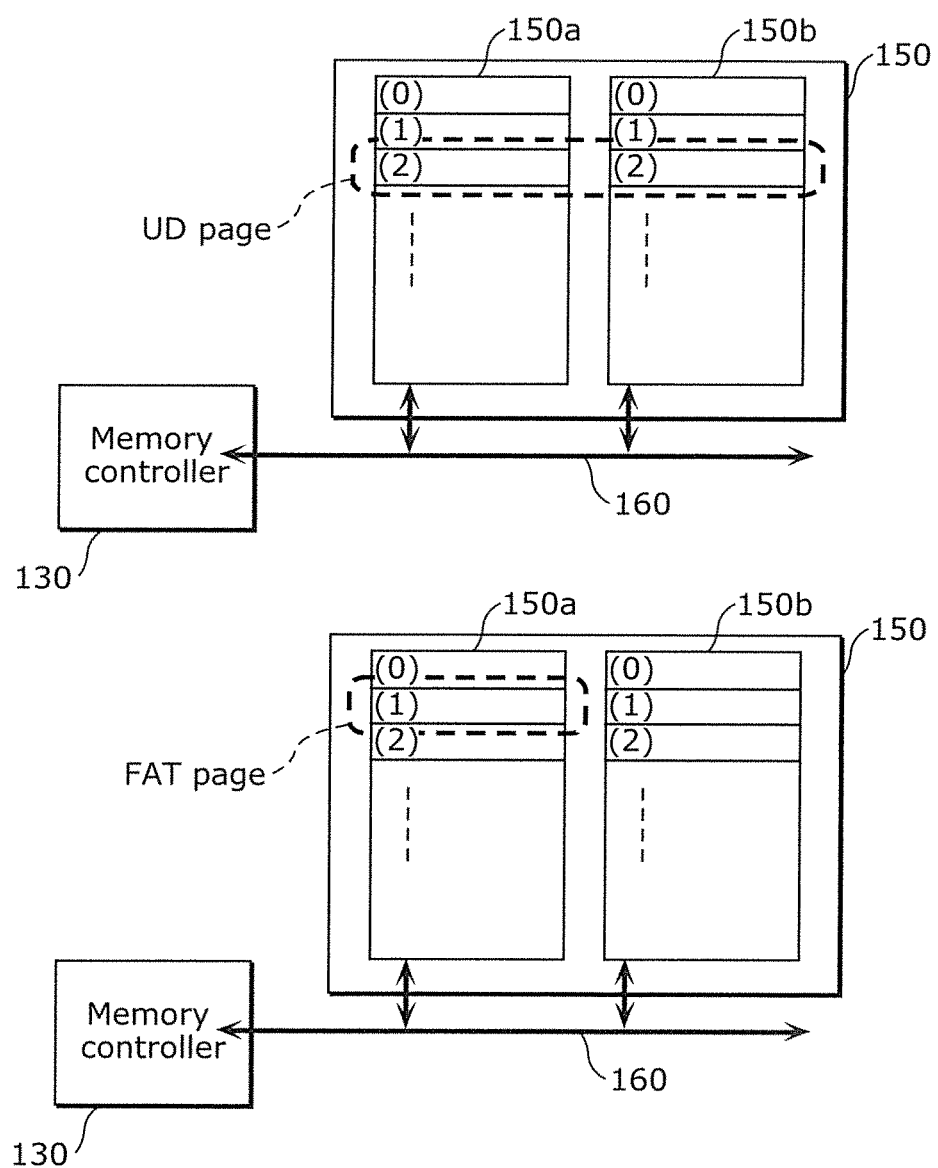
FIG. 13 illustrates a method for storing data when flash memory according to a variation includes a plurality of memory chips.

FIG. 13 illustrates a method for storing data when the flash memory 150 includes a plurality of memory chips.

In the example illustrated in FIG. 13, flash memory 150 includes two flash memories 150a and 150b connected to memory controller 130. In this example, the parallel number is 2.

The flash memory chips 150a and 150b are divided into one-page units, and each unit is assigned with a page number. In FIG. 13, the values inside the parentheses are the page numbers. In this embodiment, the page size is 16 KB.

The UD page includes a plurality of pages belonging to the same page number in flash memory chips 150a and 150b. In the example illustrated in FIG. 13, one UD page includes, for example, a page having page number (2) in the flash memory chip 150a and a page having page number (2) in the flash memory chip 150b. Therefore, in the example illustrated in FIG. 13, the size of one page is 16 KB, and since the parallel number is 2, the UD page size is 32 KB (16 KB×2=32 KB).

In this embodiment, the FAT page is managed in 16 KB units. Therefore, for example, one FAT page includes one page having page address (1) in the flash memory chip 150a. Note that in this embodiment, even if the flash memory 150 includes a plurality of flash memory chips 150a and 150b, the FAT page is allocated to one of the flash memory chips 150a and 150b, but a different allocation method may be used.

In the flash memory 150, the sizes (in this case, number of pages) of the FAT region 151 and the UD region 152 are fixed. As such, the FAT region 151 and the UD region 152 are uniquely divided by logical sector addresses. In this embodiment, the FAT region 151 is from the beginning logical sector address (0x00000000) to the first logical sector address (0x00003FFF). The UD region 152 is from the logical sector address following the first logical sector address (0x00004000) to the second logical sector address (0x00FFFFFF). Note that the method for dividing the FAT region 151 and the UD region 152 is not limited to the method described in this embodiment.

Note that the logical sector address and the actual address in the flash memory 150 need not match; an address manager 131 manages the correspondence between the addresses.

(1-1-5. Memory Controller Configuration)

The memory controller 130 receives the command analysis result transmitted from the I/F 110 and controls the writing of data to the cache memory 140 and the flash memory 150 and the reading of data from the cache memory 140 and the flash memory 150.

When the command issued by the access device 200 is a write command, the memory controller 130 performs writing processing based on the address included in the write command. The writing processing includes writing, to the cache memory 140 or the flash memory 150, write data received by the I/F 110 and temporarily stored in the buffer 120. This writing processing will be described in detail later.

When the command issued by the access device 200 is a read command, the memory controller 130 reads, from the cache memory 140 or the flash memory 150, data indicated by the logical sector address (one sector=512 bytes; hereinafter also referred to as "sector address") included in the read command, and stores the read data in buffer 120.

The memory controller 130 includes the address manager 131 and a cache manager 132. The cache manager 132 includes a FAT size setter 133.

The address manager 131 manages the correspondence between the logical sector address of write data obtained from a write command and the actual address indicating the address at which the data is actually written in the cache memory 140 and the flash memory 150. In other words, the address manager 131 manages a table that stores, for each logical sector address, an actual address indicating a region in which data corresponding to the logical sector address is stored. Inclusion of the address manager 131 makes it possible to use the non-volatile memory device 100 without the access device 200 being aware of the cache memory 140.

The address manager 131 according to this embodiment further operates as a determiner that determines whether write data is the FAT or UD, based on the logical sector address.

Note that in this embodiment, the determiner determines whether write data is the FAT or UD based on the logical sector address, but information indicating whether the write data is the FAT or UD may be added to the write command, and the determiner may determine whether write data is the FAT or UD based on the added information.

The cache manager 132 manages the cache memory 140. The cache manager 132 includes the FAT size setter 133. The FAT size setter 133 is one example of the region setter that sets the size of the FAT cache region 141 based on the frequency or number of times the write data is determined to be the FAT by the address manager 131. In this embodiment, since the unit in which the writing processing is performed for the FAT is a FAT page (one page), the FAT size setter 133 sets the size of the FAT cache region in one-page units.

(1-2. Operation)

Next, operations performed by the non-volatile memory device 100 will be described.

(1-2-1. Overall Operation)

Figure 3:
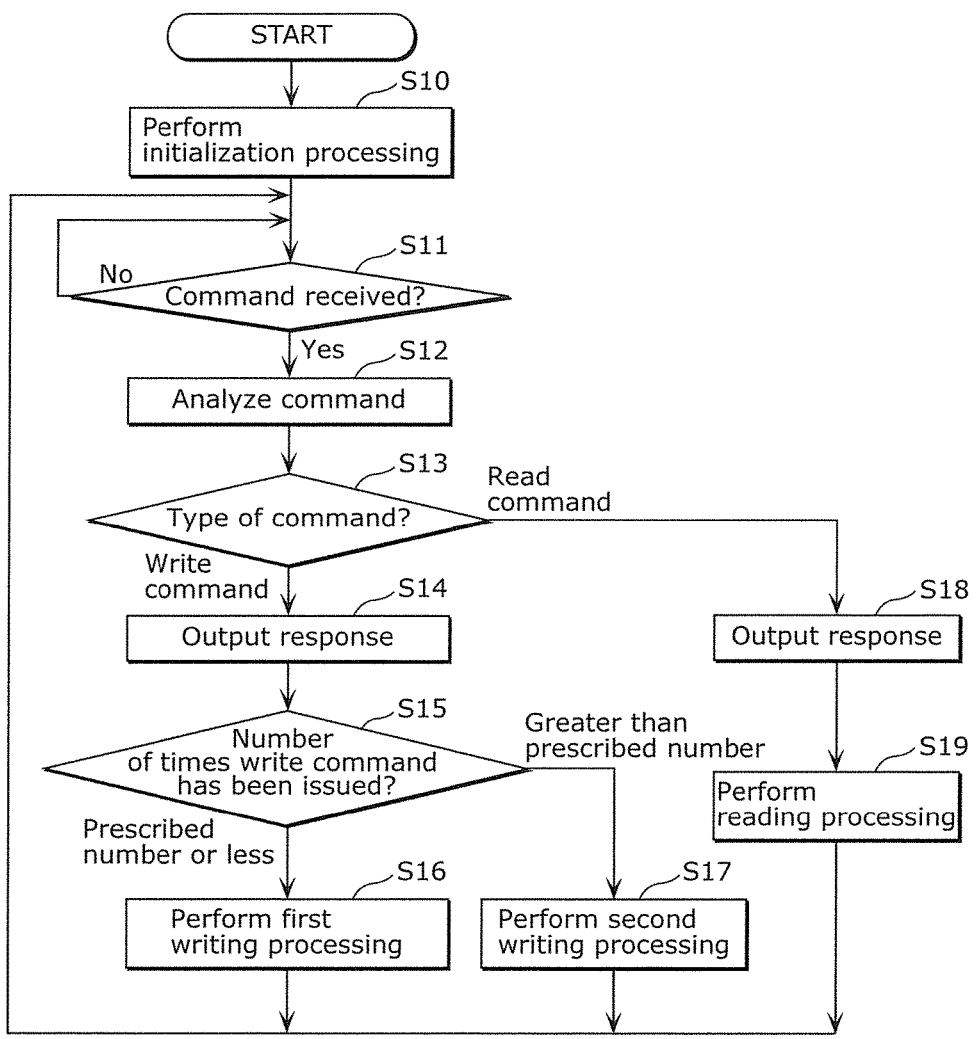
FIG. 3 is a flow chart illustrating an outline of operations performed by a non-volatile memory device according to an embodiment.
Figure 4:
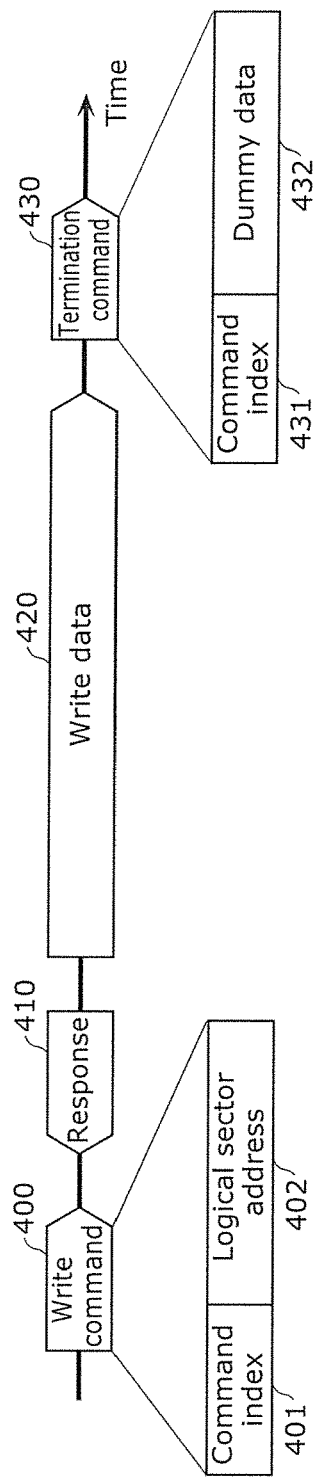
FIG. 4 illustrates a time series of the flow of writing processing including first writing processing and second writing processing.

FIG. 3 is a flow chart illustrating an outline of operations performed by the non-volatile memory device 100 according to this embodiment. FIG. 4 illustrates a time series of the flow of writing processing including the first writing processing and the second writing processing. In FIG. 4, the write command 400, write data 420, and termination command 430 indicated by the right-pointing home-plate pentagon arrows indicate data output by the access device 200 to the non-volatile memory device 100. The response 410 indicated by the right-pointing home-plate pentagon arrow indicates data output from the non-volatile memory device 100 to the access device 200.

The non-volatile memory device 100 performs initialization processing when the access device 200 is booted up (S10). In the initialization processing, the non-volatile memory device 100 performs at least writing processing of writing valid data stored in the cache memory 140 to a predetermined address in the flash memory 150 and, after the writing of the valid data to the flash memory 150, invalidation processing of invalidating all data in the cache memory 140 (in other words, freeing up all cache planes).

After the initialization processing is complete, when a command is issued by the access device 200 (yes in S11), the non-volatile memory device 100 analyzes the command via I/F 110 (S12). As illustrated in FIG. 4, this command includes command index 401 or 403, and logical sector address 402. The command index is data indicating the type of the command, and in this embodiment, includes a write command, a termination command, and a read command. The termination command is a command for pausing the writing processing performed via the write command. When the command is a write command, a beginning logical sector address that starts the writing processing is stored in the logical sector address. When the command is a read command, a beginning logical sector address that starts the reading processing is stored in the logical sector address. When the command is a termination command, dummy data is stored in the region in which the logical sector address is stored. When the command is a termination command, data indicating the size of the write data stored in the logical sector address or some other data may be stored.

When the non-volatile memory device 100 determines that the command is the write command 400 based on the analysis of the command index by the I/F 110 ("write command" in response to S13 in FIG. 3), the non-volatile memory device 100 outputs, to the access device 200, a response 410 indicating that the write command 400 has been received (S14). Further, when the I/F 110 determines that the command is the write command 400, the address manager 131 determines whether the write data is the FAT or UD from the logical sector address 402 included in the write command 400. For example, when the logical sector address 402 is between 0x00000000 and 0x00003FFF, the address manager 131 determines that the write data is the FAT. When the logical sector address 402 is between 0x00004000 and 0x00FFFFFF, the address manager 131 determines that the write data is UD.

The non-volatile memory device 100 performs the writing processing upon receipt of the write command 400. Here, the writing processing includes first writing processing, which is performed before the size of the FAT cache region 141 is set, and second writing processing, which is performed after the size of the FAT cache region 141 is set. The first writing processing includes FAT size setting processing for setting the size of the FAT cache region 141. The size of the FAT cache region 141 in the cache memory 140 is set in accordance with the frequency at which the FAT region is written to per logical sector address relative to the total number of times the first writing processing is performed. Therefore, when, for example, the non-volatile memory device 100 is installed in the access device, from the time power is supplied to the non-volatile memory device 100, the non-volatile memory device 100 performs the first writing processing until a predetermined, prescribed number of write commands are issued by the access device 200, at which point the non-volatile memory device 100 performs the FAT size setting processing. After the FAT size setting processing is performed, the second writing processing is performed in accordance with issuance of the write command.

When the number of times the write command is received, i.e., the number of times the write command is issued is a predetermined, prescribed number or less ("prescribed number or less" in response to S15), the non-volatile memory device 100 performs the first writing processing (S16). In the first writing processing, when the number of times the write command is issued is the prescribed number, the FAT size setting processing is performed. When the number of times the write command is issued is greater than the prescribed number ("greater than prescribed number" in response to S15), the non-volatile memory device 100 performs the second writing processing (S17). The first writing processing, the FAT size setting processing, and the second writing processing will be described in detail later.

When the non-volatile memory device 100 determines that the command is a read command based on the analysis of the command index by the I/F 110 ("read command" in response to S13), the non-volatile memory device 100 outputs, to the access device 200, a response indicating that the read command has been received (S18). The non-volatile memory device 100 begins the reading processing using the logical sector address (S19).

(1-2-2. First Writing Processing)

Figure 5:
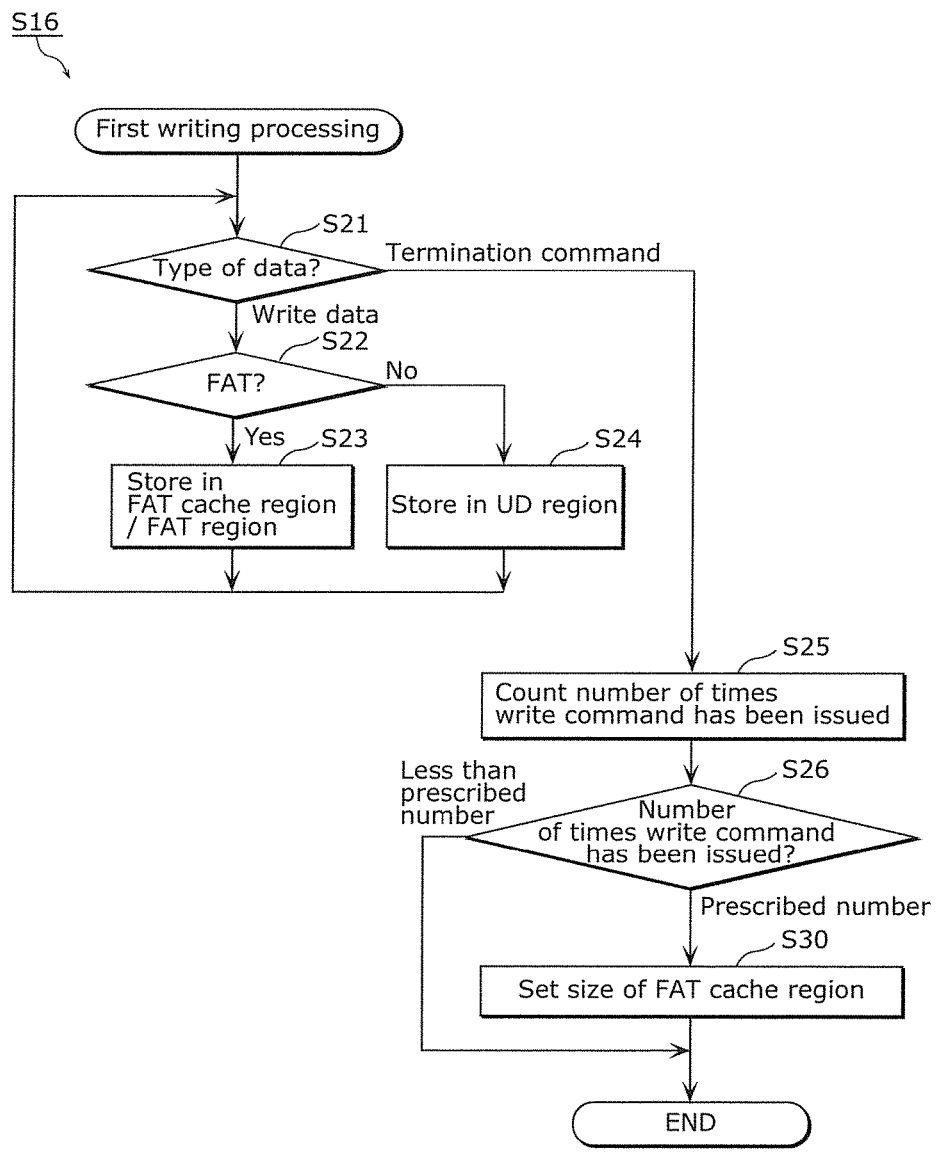
FIG. 5 is a flow chart illustrating the order of steps in the first writing processing performed by the non-volatile memory device according to Embodiment 1.

FIG. 5 is a flow chart illustrating the order of steps in the first writing processing performed by the non-volatile memory device 100 according to this embodiment.

In the first writing processing, all write data is written to flash memory 150.

Using I/F 110, the non-volatile memory device 100 analyzes whether data output from the access device 200 after the response 410 illustrated in FIG. 4 has been sent is the write data 420 or a termination command (S21 in FIG. 5). The I/F 110 determines that the data is a termination command when the command index 431 illustrated in FIG. 4 is included in the received data, and determines that the data is write data in all other cases.

As illustrated in FIG. 5, when the write data 420 is the FAT (yes in S22), the memory controller 130 writes the write data 420 to the FAT cache region 141 (S23). The determination result by the address manager 131 in step S14 is used for the determination of whether the write data 420 is the FAT or UD.

When write data of the same address is stored in the FAT cache region 141, the memory controller 130 overwrites the FAT cache region 141 with that write data. When write data of the same address is not stored in the FAT cache region 141 and there is free space in the FAT cache region 141, the memory controller 130 writes that data to the free space in the FAT cache region 141. When write data of the same address is not stored in the FAT cache region 141 and there is no free space in the FAT cache region 141 (cache overflow in the FAT cache region), the memory controller 130 moves data having the oldest update time among data stored in the FAT cache region 141 to the flash memory 150. Further, the memory controller 130 overwrites the region in which the moved data was stored with the write data.

When the write data 420 is the UD (no in S22), the non-volatile memory device 100 writes the write data 420 to the UD region 152 (S24).

When the received data is a termination command ("termination command" in response to S21), the non-volatile memory device 100 counts the number of times the write command has been issued (S25). Further, when the data written by the write command terminated by the termination command is the FAT, the non-volatile memory device 100 counts the number of times the write command has been issued per page. More specifically, the FAT size setter 133 records a page address identified by subtracting a value less than 16 kb (=0x20 sectors) from the logical sector address included in the write command 400.

If the number of times the write command has been issued reaches the prescribed number, the non-volatile memory device 100 performs the FAT size setting processing (S30).

(1-2-3. Setting the FAT Cache Region Size (FAT size setting processing))

The FAT size setter 133 sets the number of planes to be allocated for the FAT cache region 141 in the cache memory 140, from a distribution of the number of writes in the first writing processing per FAT page address.

Here, the FAT size setter 133 sums the number of writes in order from the page address (i.e., the logical sector address) having the highest update frequency, that is to say, the most number of writes, and sets the number of planes for the FAT cache to the number of planes for the page address when the sum becomes a predetermined value or larger.

More specifically, the FAT size setter 133 sums the number of writes in order starting from the page address having the most number of writes. When the cumulative value of the number of writes becomes 90% or greater, the FAT size setter 133 sets the number of page addresses for which the number of writes were accumulated to the number of planes to be allocated for the FAT cache region 141 in the cache memory 140.

Figure 6A:
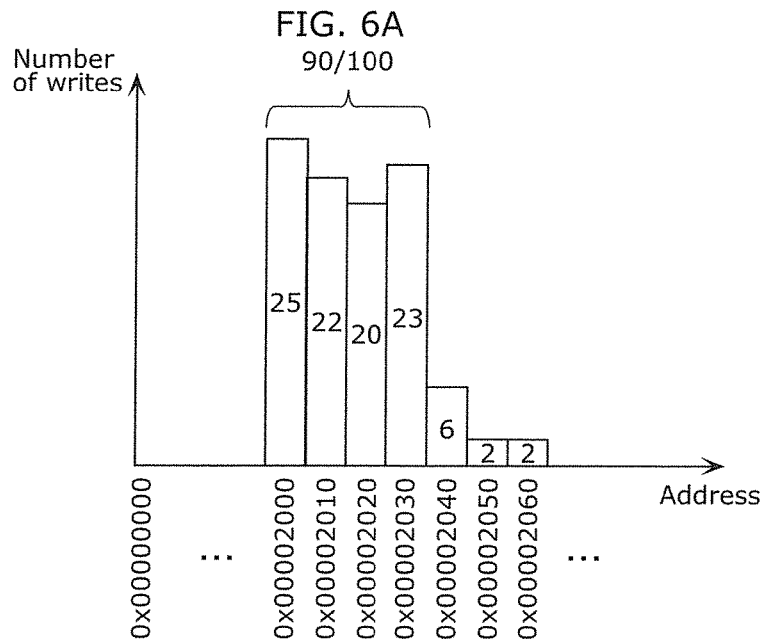
FIG. 6A is a graph illustrating one example of a distribution of the number of writes for each page address (i.e., logical sector address) in the first writing processing.

FIG. 6A is a graph illustrating one example of a distribution of the number of writes for each page address (i.e., logical sector address) in the first writing processing. In FIG. 6A, the prescribed number of instances of the first writing processing is 100 times. In FIG. 6A, in order starting from most number of writes, the page addresses are 0x00002000, 0x00002030, 0x00002010, 0x00002020, and 0x00002040. In FIG. 6A, by adding the number of writes in order starting from the page number with the most number of writes, the sum of the number of writes for addresses up to 0x00002020 reaches 90 times, which is 90% of 100 writes. Here, the number of page addresses is four: 0x00002000, 0x00002030, 0x00002010, and 0x00002020. This number is set to the number of planes to be allocated for the FAT cache region 141 in the cache memory 140.

As a result, when the size of the cache memory 140 is 512 KB, the FAT cache region 141 is four planes, that is to say, is a total of 64 KB. On the other hand, the size of the UD cache region 142 is 448 KB (512 KB−64 KB=448 KB), and the number of planes for the UD cache is 14 (448 KB/32 KB=14 planes).

Figure 6B:
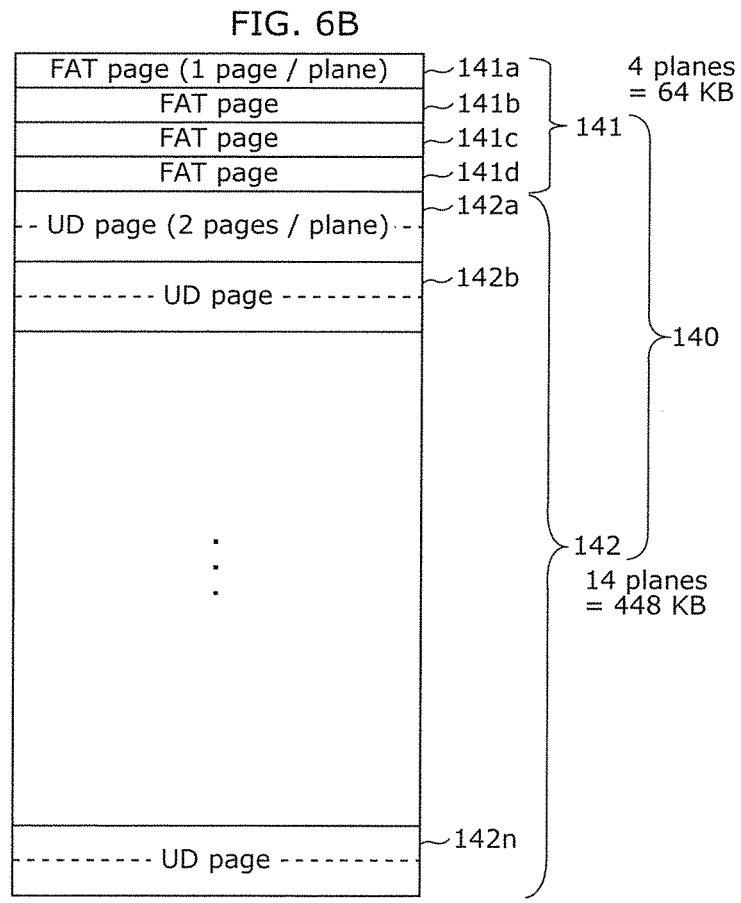
FIG. 6B illustrates an example of the allocation of a FAT cache region calculated from the distribution for the number of writes illustrated in FIG. 6A.

FIG. 6B illustrates an example of the allocation of the FAT cache region 141 calculated from the distribution of the number of writes illustrated in FIG. 6A. In FIG. 6B, four planes corresponding to FAT pages 141a through 141d are allocated for the FAT cache region 141. Moreover, 14 planes corresponding to UD pages 142a through 142n are allocated for the UD cache region 142.

Figure 7A:
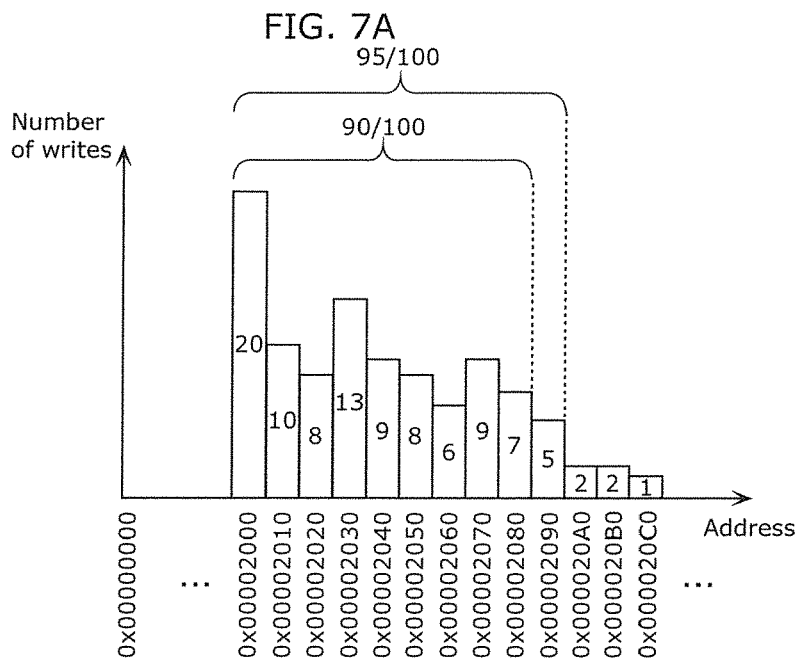
FIG. 7A is a graph illustrating another example of a distribution of the number of writes for each page address in the first writing processing.

FIG. 7A is a graph illustrating another example of a distribution of the number of writes for each page address in the first writing processing. Similar to FIG. 6A, in FIG. 7A, the prescribed number of instances of the first writing processing is 100 times. In FIG. 7A, the sum of the number of writes for the top nine page addresses according to number of writes is 90. Thus, at least nine planes worth of FAT pages may be secured for the FAT cache region 141.

Here, when nine 16 KB planes are secured for the FAT cache region 141, the capacity allocated as the UD cache region 142 is 368 KB (512 KB−16 KB×9=368 KB). Here, the number of planes in the UD cache region 142 is 11.5 (368 KB/32 KB=11.5), and the 0.5 plane portion cannot be used as the UD cache region 142.

Moreover, since the region of the cache memory 140 excluding the FAT cache region 141 is typically allocated for the UD cache region 142, the number of planes for the FAT cache is preferably secured such that the size of the region allocated for the UD cache region 142 is a multiple of the UD page size. Moreover, as described above, when space cannot be allocated for the UD cache region 142, the space is preferably allocated as the FAT cache region 141.

Thus, in FIG. 7A, instead of the top nine page addresses for which the total number of writes is 90, FAT pages for the top 10 page addresses for which the total number of writes is 95 may be secured, i.e., the number of planes to be allocated for the FAT cache region 141 may be set to 10.

Figure 7B:
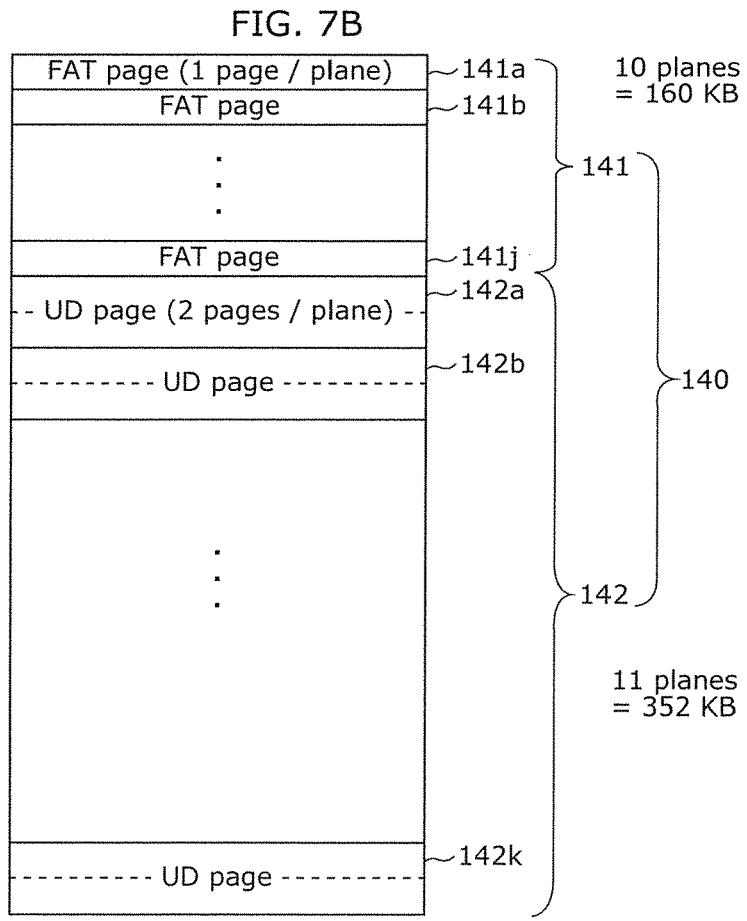
FIG. 7B illustrates an example of the allocation of a FAT cache region calculated from the distribution for the number of writes illustrated in FIG. 7A.

FIG. 7B illustrates an example of the allocation of the FAT cache region 141 calculated from the distribution for the number of writes illustrated in FIG. 7A. In the example illustrated in FIG. 7A, the number of planes for the FAT cache region 141 is set in two-page units. Two pages is the least common multiple of the one-page FAT processing unit and the two-page UD processing unit. In the case of the example illustrated in FIG. 7A, the FAT size setter 133 sets the size of the FAT cache region 141 to 10 planes (FAT pages 141a through 141j). The FAT size setter 133 sets the size of the UD cache region 142 to 11 planes. This makes it possible to secure the necessary number of planes for the FAT cache region 141 and efficiently use the cache memory 140 without there being any regions that are unused.

The memory controller 130 moves the data for page addresses having a high update frequency from the flash memory 150 to the cache memory 140, and as necessary, moves the FAT to the flash memory 150 so that there are sequential FAT regions.

After setting the size of the FAT cache region 141, when a write command is further received, the second writing processing (to be described hereinafter) is performed for the FAT and for UD.

(1-2-4. Second Writing Processing)

Figure 8:
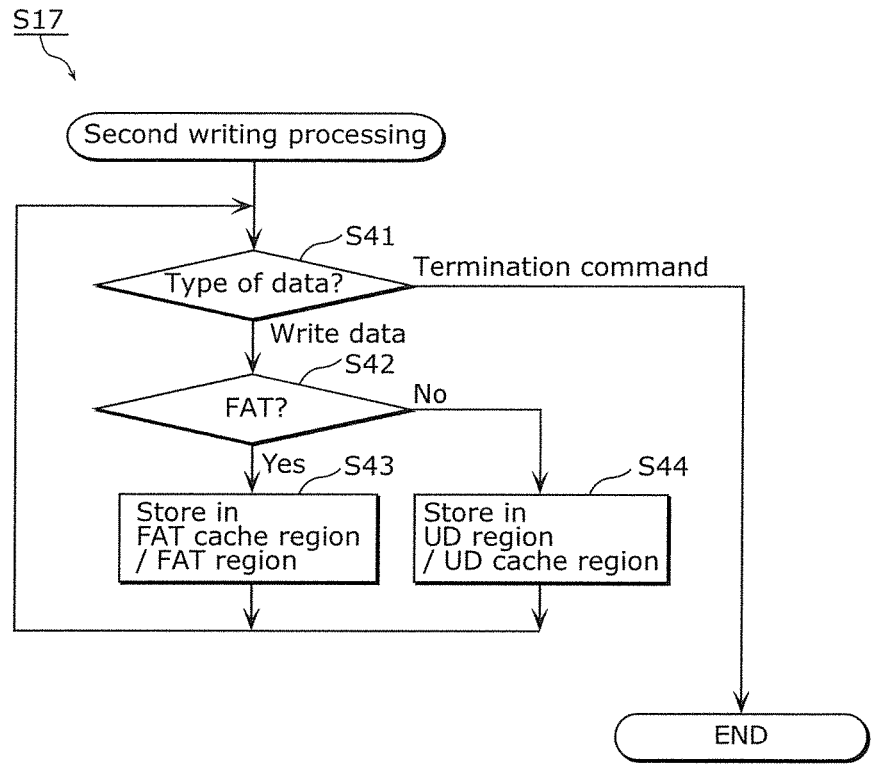
FIG. 8 is a flow chart illustrating the order of steps in the second writing processing performed by the non-volatile memory device according to Embodiment 1.

FIG. 8 is a flow chart illustrating the order of steps in the second writing processing performed by the non-volatile memory device 100 according to this embodiment. In the second writing processing, write data is written to the cache memory 140 and the flash memory 150. Here, as illustrated in FIG. 6A and FIG. 6B, the size of the FAT cache region 141 is exemplified as being four planes.

When data is output from the access device 200, the non-volatile memory device 100 determines whether the data is the write data 420 or a termination command (S41).

When the data output from the access device 200 is determined to be the write data 420 illustrated in FIG. 4 ("write data" in response to S41), the non-volatile memory device 100 temporarily holds the write data 420 in the buffer 120. Note that there are times when the write data 420 is transmitted all at once and times when the write data 420 is divided and transmitted in blocks.

Further, the address manager 131 determines whether the write data 420 is the FAT or UD (S42). The write data 420 stored in the buffer 120 is written to the cache memory 140 or the flash memory 150 according to the determination result by the address manager 131 (S43, S44). Note that the buffer 120 is also divided into small regions of a predetermined size, such as into pages, and managed.

Figure 9:
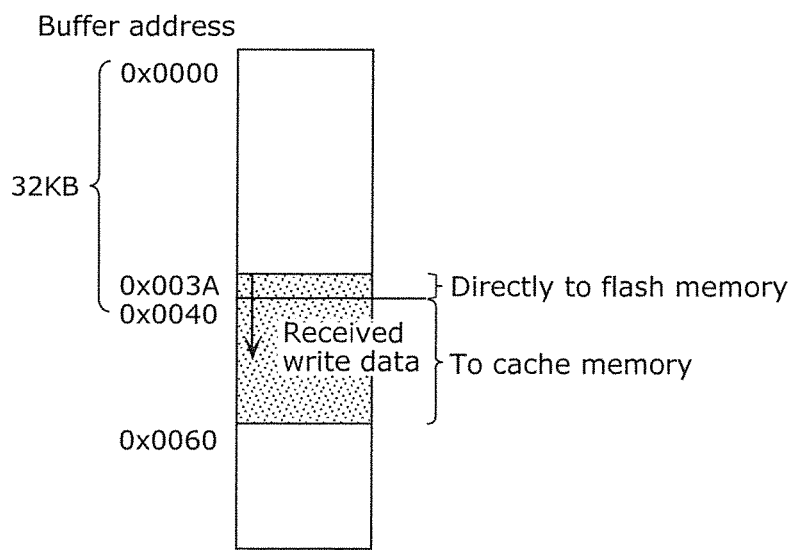
FIG. 9 illustrates an example of write data stored in a buffer according to Embodiment 1.
Figure 10:
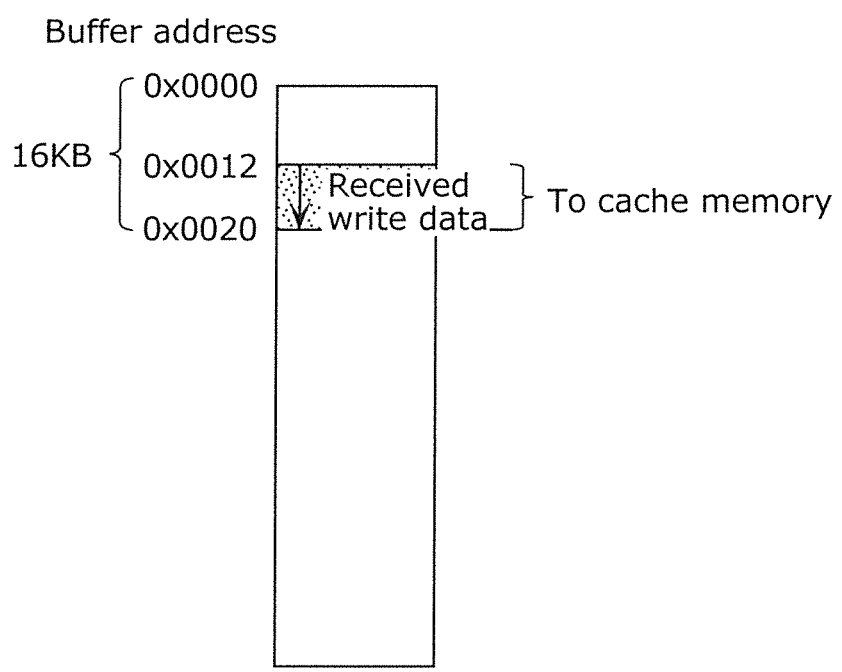
FIG. 10 illustrates an example of write data stored in a buffer according to Embodiment 1.

FIG. 9 and FIG. 10 illustrate examples of the write data 420 stored in the buffer 120 according to this embodiment.

As illustrated in FIG. 9 and FIG. 10, when the write data 420 is stored in the buffer 120, it is aligned at a boundary of a FAT page or a UD page (the former being 16 KB and the latter being 32 KB). Moreover, when the non-volatile memory device 100 stores the write data 420 sequentially in the buffer 120 and the write data 420 surpasses the write boundary of the subsequent FAT or UD, the data before the write boundary is not held in the cache memory 140 but directly written to the flash memory 150.

When the termination command 430 is received before the write data 420 surpasses the write boundary, the non-volatile memory device 100 writes the write data 420 to the cache memory 140 in the above described writing units.

Here, as illustrated in FIG. 9, the sector address is exemplified as 0x0001003A. Here, since 0x0001003A is greater than 0x00003FFF, the data stored in this sector address is determined to be UD by the address manager 131. Therefore, in the buffer 120, in order to align the write data 420 with the boundary for the UD page (32 KB=0x40 sectors), which is the UD processing unit, the write data 420 is stored from buffer address 0x3A.

When the termination command 430 is not received even though the writing of write data 420 reaches the buffer address 0x0040, i.e., the UD writing unit boundary, the non-volatile memory device 100 carries on storing the write data 420 in the buffer 120. Here, the data from 0x003A to 0x0040 in the buffer 120 is not stored in the cache memory 140 but directly written into the flash memory 150 at a predetermined sector address.

On the other hand, when the termination command 430 is received at the point in time when the write data 420 reaches the buffer address 0x0060, the data from 0x0040 to 0x0060 in the buffer 120 is forwarded to the cache memory 140.

Moreover, another conceivable example is when the sector address is 0x00001012, as illustrated in FIG. 10. Here, since 0x00001012 is less than 0x00003FFF, the data stored in this sector address is determined to be the FAT by the address manager 131. Therefore, in the buffer 120, in order to align the write data with the boundary for a page (16 KB=0x20 sectors), which is the FAT writing unit, the received write data is stored from buffer address 0x12.

When the termination command 430 is received at the point in time when the write data reaches the buffer address 0x0020, the data from 0x0012 to 0x0020 in the buffer 120 is forwarded to the cache memory 140. Note that in this embodiment, in the case of FAT, an example is given in which the boundary is not surpassed. When the data corresponding to the sector address included in the write command is already stored in the cache memory 140, the memory controller 130 overwrites the data stored in the cache memory 140 with the write data received at the I/F 110. When data corresponding to the sector address included in the write command is not stored in the cache memory 140, the memory controller 130 moves data updated the longest time ago to the flash memory 150 and overwrites the region in which the data updated the longest time ago is stored with the write data.

Figure 11A:
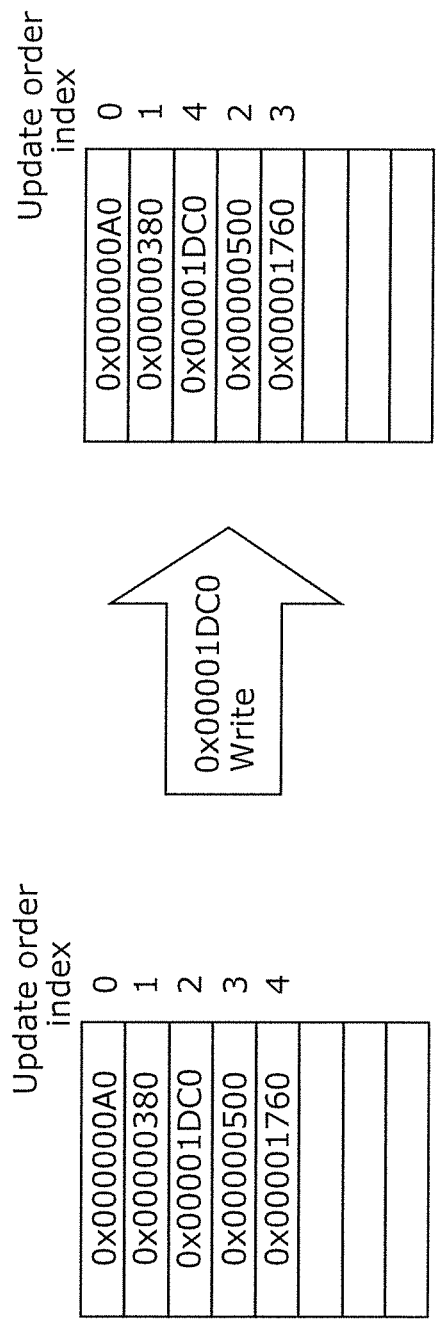
FIG. 11A illustrates state of the cache memory according to Embodiment 1.
Figure 11B:
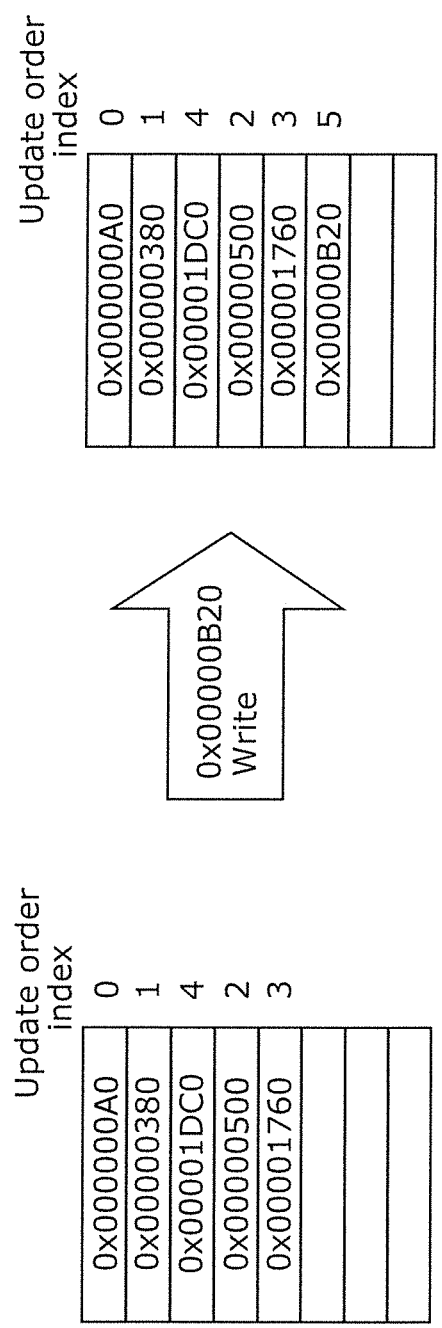
FIG. 11B illustrates a state of the cache memory according to Embodiment 1.
Figure 11C:
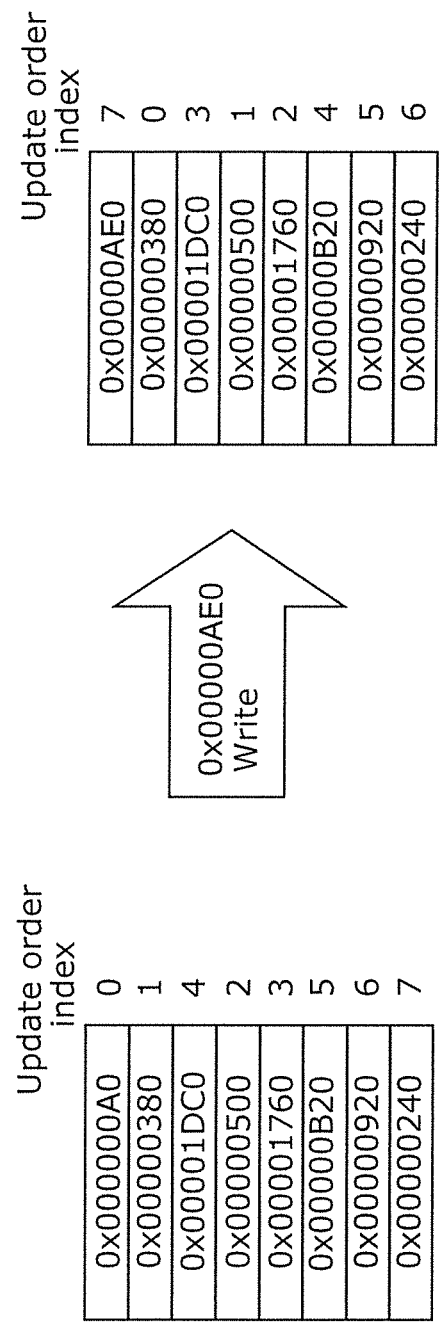
FIG. 11C illustrates a state of the cache memory according to Embodiment 1.

FIG. 11A through FIG. 11C illustrate cache memory 140 states according to this embodiment. Note that in the following example, the write data is the FAT, but the same applies when the write data is UD. For the purpose of illustration, in FIG. 11A through FIG. 11C, the FAT cache region 141 is exemplified as being 8 planes of 16 KB FAT pages.

For each plane in the cache memory 140, the cache manager 132 manages the sector address for data in the plane and the update index. In FIG. 11A through FIG. 11C, the value (hexadecimal value) in each region represents the logical sector address for data stored in that region. Note that the sector address is a logical sector address used when the access device 200 performs the writing processing or reading processing, and is managed in 16 KB (=0×20 sectors) units. Moreover, the update order index is a barometer for the timing at which the cache plane data is updated, where smaller numbers indicate older update times. Note that the internal clock value at the time the cache plane is updated may be used in place of the update index.

FIG. 11A illustrates an example in which data is stored in FAT pages for five of the eight planes in the FAT cache region 141 and the FAT pages in which data is already stored is updated. In FIG. 11A, data for sector addresses 0x000000A0, 0x00000380, 0x00001DC0, 0x00000500, and 0x00001760 are stored in this order in FAT pages for four planes. In FIG. 11A, new data for sector address 0x00001DC0 stored in the buffer 120 is written over old data for sector address 0x00001DC0 stored in the FAT pages in the cache memory 140. Note that when sector data on or after 0x00001DC8 is required to be updated, data from 0x00001DC0 to 0x00001DC7 is not updated in the cache. Use of a device capable of being overwritten in bit units, such as ReRAM, as cache memory 140 is preferable since additional processing, such as a saving process, is not necessary.

Further, memory controller 130 updates the update order index. More specifically, the value in the update order index corresponding to the FAT page in which data for sector address 0x00001DC0 is stored is updated to the greatest value currently set in the update order index. Moreover, update order index values corresponding to planes other than sector address 0x00001DC0 are decremented by one. Note that this process also applies to when page data is stored in all planes.

FIG. 11B illustrates an example in which data is stored in FAT pages for five of the eight planes in the FAT cache region 141 and data for a sector address not stored in cache is added. In FIG. 11B, data for sector address 0x00000B20 is added. In this case, the data for sector address 0x00000B20 is stored in a FAT page in which data is not stored. Then, the update order index value for the FAT page is set to a value equal to the greatest update order index currently set incremented by one. In other words, the update order index value for the FAT page to which data has been added is the greatest value.

FIG. 11C illustrates an example in which data is stored in all FAT pages in the FAT cache region 141 and data not stored in the cache memory 140 is written. In the example illustrated in FIG. 11C, data for sector address 0x00000AE0 is written. In this case, data for sector address 0x00000A0, which has the smallest value in the update order index (i.e., has the oldest update time) is expelled from the cache memory 140 and written into the flash memory 150. Then, data for the sector address 0x00000AE0 supplied from the buffer 120 is written to the empty FAT page. Furthermore, the values in the update order index are updated so that the data for sector address 0x00000AE0 is indicated as being most recently updated. More specifically, the update order index value in the plane for the sector address 0x00000AE0 is set as the highest value, and update order index values in other planes are decremented by one.

Note that the timing at which page data is expelled from the cache memory 140 and written to flash memory 150 is not limited to the example illustrated in FIG. 11C. For example, when a saving process is performed in flash memory 150, when the data in the FAT page (or UD page) to be saved is stored in the cache memory 140, after the data is supplied to the flash memory 150, the cache plane can be placed in an unused state.

Returning to FIG. 8, when the data output from the access device 200 is the termination command ("termination command" in response to S41), the non-volatile memory device 100 ends the writing processing. Note that the termination command is issued by the access device 200 when transfer of the write data 420 by the write command 400 is complete or when the transfer is to be interrupted. The termination command 430 includes at least the command index 431 for identifying the type of command. As described above, the termination command 430 may include dummy data 432 to conform with the format of another command.

The termination command 430 is received by the I/F 110 and the command index 431 is decoded by the I/F 110. When the result indicates termination command, the write command processing is terminated.

Note that there are other methods of notifying the non-volatile memory device 100 of the write data size, such as by embedding the write data size in the write command 400 or transmitting a command notifying of the write data size before the write command 400.

(1-3. Advantageous Effects, etc.)

As described above, in this embodiment, the size of the FAT cache region allocated in the cache memory 140 is adaptively changed in accordance with the number of planes of FAT pages having a high data update frequency. More specifically, the non-volatile memory device 100 according to this embodiment monitors for a predetermined, prescribed number of instances of the writing processing after being booted up, and calculates the update frequency (update count) by counting the number of writes per page address.

Since the non-volatile memory device 100 according to this embodiment sets the size of the FAT cache region by monitoring FAT update patterns from the access device, an optical cache region can be allocated without obtaining special data for obtaining the size of the FAT cache region from the access device. This is particularly effective when the non-volatile memory device is swappable relative to the access device, like an SD card or USB memory.

Moreover, since the number of planes having a high update frequency varies depending on, for example, the configuration of the access device 200, by calculating the update frequency when the connected access device can be assumed to have been updated, such as after being booted up, the cache memory 140 can be allocated in accordance with the configuration of the access device 200. This makes it possible to inhibit data having a comparatively low update frequency from residing in the cache memory 140, which makes it possible to more efficiently use the cache memory 140.

Moreover, since the non-volatile memory device 100 according to the above embodiment can store data having a comparatively low update frequency in the flash memory 150, the number of writes to the flash memory 150 can be reduced accordingly. As a result, it is possible to increase the lifespan (length of time of usability) of the flash memory 150 and thus the non-volatile memory device 100.

Further, in this embodiment, by allocating planes of the cache memory 140 not allocated as the FAT cache region as the UD cache region, it is possible to inhibit writing to flash memory 150 in the case of UD overwriting.

Embodiment 2

Embodiment 1 did not specify to which region of the cache memory 140 the FAT cache region 141 is allocated. In contrast, in this embodiment, the beginning address of the FAT cache region 141 is set to a different address than the beginning address of the FAT cache region 141 set before being booted up.

Hereinafter, the configurations according to Embodiment 2 that are different from Embodiment 1 will be described with reference to FIG. 12. In this embodiment, the next byte address after the last byte address in the FAT cache region 141 set upon the previous boot-up is set to the beginning byte address of the FAT cache region 141 upon the current boot-up.

Figure 12A:
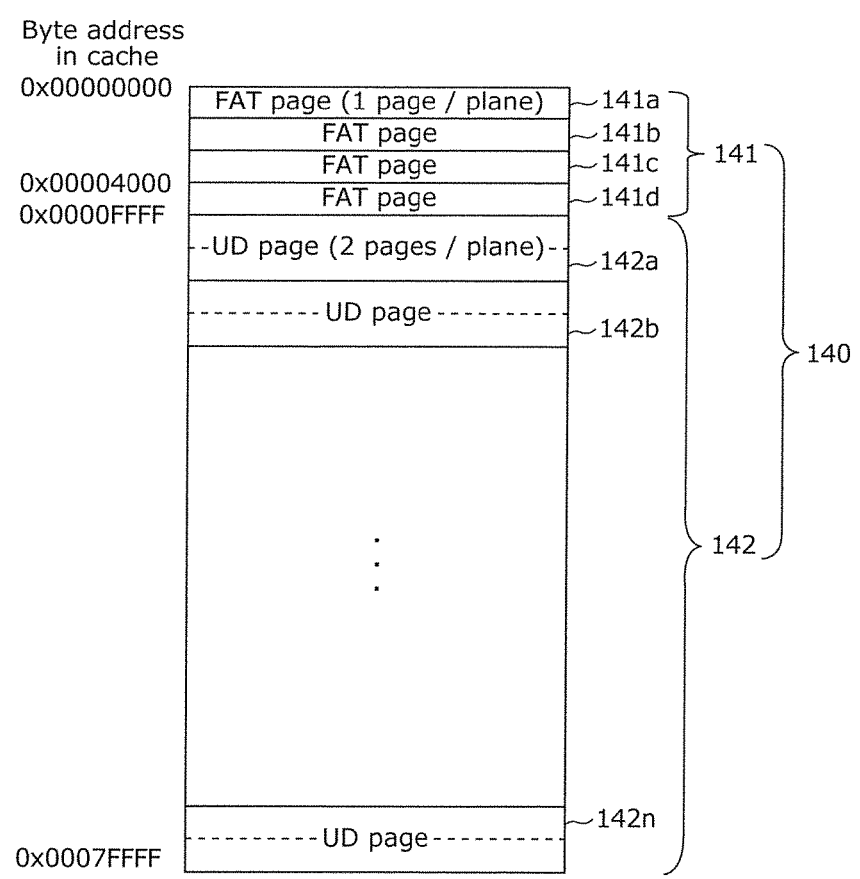
FIG. 12A illustrates the state of a cache memory upon first boot-up according to Embodiment 2.
Figure 12B:
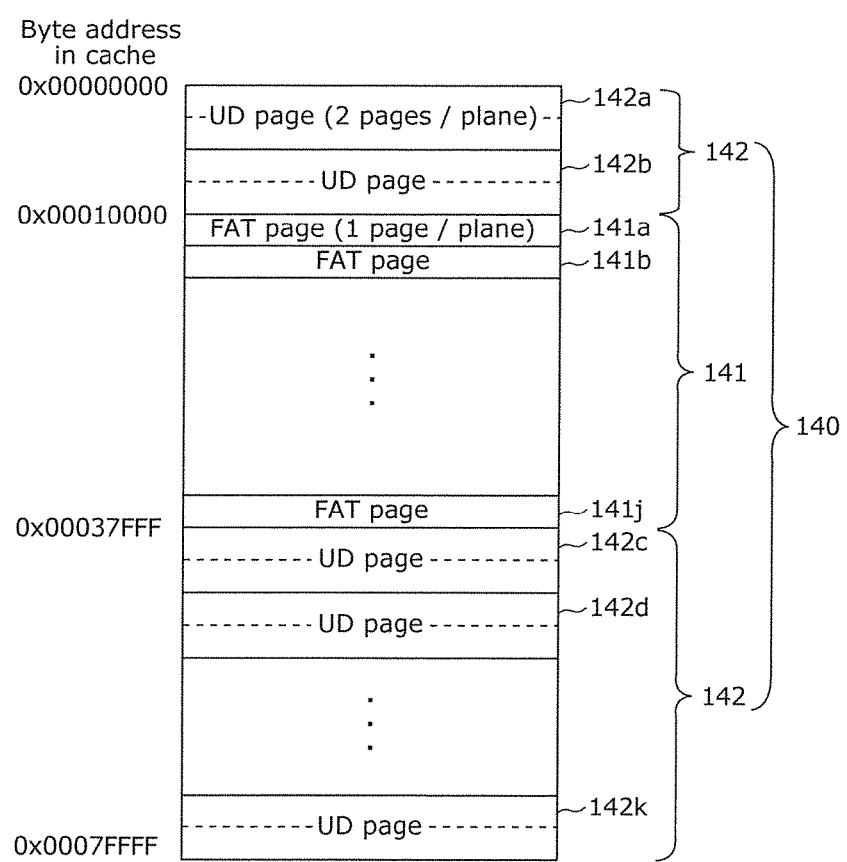
FIG. 12B illustrates the state of the cache memory upon second boot-up according to Embodiment 2.

FIG. 12A illustrates the state of the cache memory upon the first boot-up according to this embodiment, and FIG. 12B illustrates the state of the cache memory upon the second boot-up according to this embodiment.

This embodiment supposes that the counting results of the number of writes for the FAT upon the first boot-up (for example, after being booted up for the first time after shipment) are the results illustrated in FIG. 6A. Here, as described in Embodiment 1, four planes are secured for the FAT cache region 141 by the memory controller 130. Here, as illustrated in FIG. 12A, four sequential planes (four FAT pages) from the beginning address of cache memory 140 are secured for the FAT cache region 141. In other words, the region from byte address 0x00000000 to byte address 0x0000FFFF in the cache memory 140 is the FAT cache region 141.

Next, suppose that the counting results of the number of writes for the FAT upon the second boot-up are the results illustrated in FIG. 7A. Here, 10 planes are secured for the FAT cache region 141 by the memory controller 130. Here, as illustrated in FIG. 12B, the ten planes corresponding to the byte addresses from 0x00010000 to 0x00037FFF following the FAT page of the byte address 0x0000FFFF used as the FAT cache region 141 upon the first boot-up are allocated as the FAT cache region 141 upon the second boot-up. The remaining nine planes from 0x00038000 to 0x0007FFFF and the two planes from 0x00000000 to 0x0000FFFF are allocated as the UD cache region 142.

Then, similarly, the next byte address after the last byte address in the FAT cache region 141 set upon the previous boot-up is allocated as the beginning address of the FAT cache region 141 upon the current boot-up. Note that when the end of the FAT cache region 141 is reached, the beginning is returned to.

Among types of memory capable of being accessed in bit units that can be used as the cache memory 140, there are some memory devices that are limited in how many times writing can be performed, such as ReRAM (however, compared to the flash memory 150, the number of times that writing can be performed is high).

When such a memory device is used as cache memory 140, according to this embodiment, the lifespan of the cache memory 140 and thus the non-volatile memory device 100 can be increased by balancing the number of writes between the FAT pages in the cache memory 140.

Other Embodiments (1) Parameters used in Embodiments 1 and 2 described above, such as the prescribed number (100 times in this embodiment) used for the setting of the page size, parallel number, or FAT cache region plane count, or the threshold for the total access count value (90 times in this embodiment), may be freely selected by the designer in accordance with the device to be used or a conceivable access pattern. Moreover, one or more of these parameters may be configured so as to be changeable after shipment of the non-volatile memory device according to the present invention.

(2) In Embodiments 1 and 2 described above, the size of the FAT cache region 141 is set according to the frequency of the writing of the FAT, but this example is not limiting. For example, the size of the FAT cache region 141 may be set according to the number of page addresses for which writing was performed a predetermined number of times or more (performed a threshold of times or more). For example, in FIG. 6A, when the page count for pages written to 10 times or more is calculated as the size of the FAT cache region 141, the size of the FAT cache region 141 is set to four planes. (3) Moreover, in Embodiments 1 and 2 described above, the FAT and UD are exemplified as being written in page units, but this example is not limiting. The FAT and UD may be managed in arbitrary units other than page units.

(4) In Embodiments 1 and 2 described above, the flash memory 150 is exemplified as including two memory chips, but this example is not limiting. The flash memory 150 may include a single memory chip, and, alternatively, may include three or more memory chips.

In this case, the size of UD data need not depend on the parallel number. The size of UD data may be, for example, the product of 1 page size×the parallel number. For example, when the flash memory 150 includes four memory chips (i.e., when the parallel number is four), the size of the processing unit of UD is 64 KB (16 KB×4).

(5) In Embodiments 1 and 2 described above, in step S23 in FIG. 5, write data is exemplified as being written to the FAT cache region 141, but write data may be written to the FAT region 151.

Moreover, for example, the initial sizes of the FAT cache region 141 and the UD cache region 142 may be set in advance. In this case, using the same method as used for the FAT in step S23, in the case of UD in step S24 as well, when the inputted write data is written to the UD cache region 142 and the UD cache region 142 overflows, for example, using the same steps as used for the FAT, UD is stored in the flash memory 150.

Note that in the examples in Embodiments 1 and 2 described above, the initial value of the size of the FAT cache region 141 is set to the size of the cache memory 140. In the setting of the size of the FAT cache region in step S30, the size of the FAT cache region is reset (changed) from the initial setting to the size determined in accordance with the number of times the write command is issued.

As described above, the embodiments have been presented as examples of the techniques in the present disclosure. To this extent, the accompanying drawings and detailed description are provided.

Thus, the components set forth in the accompanying drawings and detailed description include not only components essential to solve the problems but also components not necessary to solve the problems for the purpose of illustrating the above embodiments. Thus, those unnecessary components should not be deemed essential due to the mere fact that they are described in the accompanying drawings and the detailed description.

Moreover, the above embodiments are examples of the techniques of the present disclosure, and thus various modifications, permutations, additions and omissions are possible within the scope of the appended claims and the equivalents thereof.

INDUSTRIAL APPLICABILITY

The present disclosure is applicable to, for example, memory devices that use flash memory. In particular, in the case of a memory device that is swappable relative to the access device, significant advantageous effects are yielded. More specifically, the present disclosure is effective in SD cats, solid state drives (SSDs) and USB memory.

The invention claimed is:

1. A memory device, comprising:
    first non-volatile memory including a control information region that stores control information for a file and a user data region that stores user data;
    second non-volatile memory including a control information cache region that stores all or part of the control information;
    an access controller that receives a write command for writing one of the control information and the user data; and
    a memory controller that sets a size of the control information cache region,
    wherein the memory controller includes:
    a determiner that determines whether write data to be written is the control information or the user data based on an address included in the write command; and
    a region setter that sets the size of the control information cache region based on one of an update frequency and an update count for the address-included in the write command for the write data determined to be the control information by the determiner.

2. The memory device according to claim 1, wherein
    the first non-volatile memory is configured to perform the writing in page units all at once and is limited in how many times the writing can be performed,
    the second non-volatile memory is capable of performing the writing in a unit other than page units, and
    the region setter sets the size of the control information cache region in page units.

3. The memory device according to claim 1, wherein
    the first non-volatile memory is flash memory, and
    the second non-volatile memory is resistive random access memory.

4. The memory device according to claim 3, wherein
    the memory controller allocates a beginning address of the control information cache region that is a current control information cache region to an address that is different than a beginning address of the control information region that precedes the current control information cache region.

5. The memory device according to claim 1, wherein
    the region setter increases the size of the control information cache region with an increase in the one of the update frequency and the update count.

6. The memory device according to claim 1, wherein
    the writing of the control information is performed in a predetermined unit size, and
    the writing of the user data is performed in a unit size different than the unit size for the writing of the control information.

7. The memory device according to claim 1, wherein
    the region setter sets the size of the control information cache region using results of the determination for a predetermined number of the write commands after the memory device has been booted up.

8. The memory device according to claim 1, wherein
    the second non-volatile memory further includes a user data cache region that stores all or part of the user data,
    when the one of the update frequency and the update count for the address included in the write command for the write data determined to be the control information by the determiner is a predetermined value or less,
    the writing of the control information is performed in one of the control information cache region in the second non-volatile memory and the control information region in the first non-volatile memory, and the writing of the user data is performed in the user data region in the first non-volatile memory, and
    when the one of the update frequency and the update count for the address included in the write command for the write data determined to be the control information by the determiner is greater than the predetermined value,
    the writing of the control information is performed in one of the control information cache region in the second non-volatile memory and the control information region in the first non-volatile memory, and the writing of the user data is performed in one of the user data cache region in the second non-volatile memory and the user data region in the first non-volatile memory.

9. A method for controlling a memory device, the memory device including:
    first non-volatile memory including a control information region that stores control information for a file and a user data region that stores user data;
    second non-volatile memory including a control information cache region that stores all or part of the control information;
    an access controller that receives a write command for writing one of the control information and the user data; and
    a memory controller that sets a size of the control information cache region, and
    the method being executed in the memory device and comprising:
    determining, by the memory controller, whether write data to be written is the control information or the user data based on an address included in the write command; and
    setting, by the memory controller, the size of the control information cache region based on one of an update frequency and an update count for the address included in the write command for the write data determined to be the control information by the determiner.

10. The method according to claim 9, wherein
    the second non-volatile memory in the memory device further includes a user data cache region that stores all or part of the user data,
    when the one of the update frequency and the update count for the address included in the write command for the write data determined to be the control information in the determining is a predetermined value or less,
    the writing of the control information is performed in one of the control information cache region in the second non-volatile memory and the control information region in the first non-volatile memory, and the writing of the user data is performed in the user data region in the first non-volatile memory, and
    when the one of the update frequency and the update count for the address included in the write command for the write data determined to be the control information in the determining is greater than the predetermined value,
    the writing of the control information is performed in one of the control information cache region in the second non-volatile memory and the control information region in the first non-volatile memory, and the writing of the user data is performed in one of the user data cache region in the second non-volatile memory and the user data region in the first non-volatile memory.

\* \* \* \* \*